United States Patent [19]

Vogrin

[11] Patent Number: 5,312,091
[45] Date of Patent: May 17, 1994

[54] METHOD AND DEVICE FOR DEBURRING ESPECIALLY A STEEL STRIP CUT INTO SLABS

[75] Inventor: Erwin Vogrin, Pfastatt, France

[73] Assignees: Sollac, Puteaux; Innovation Process Vogrin, Mulhouse, both of France

[21] Appl. No.: 952,702

[22] PCT Filed: Mar. 20, 1992

[86] PCT No.: PCT/FR92/00260
§ 371 Date: Nov. 25, 1992
§ 102(e) Date: Nov. 25, 1992

[87] PCT Pub. No.: WO92/16331
PCT Pub. Date: Oct. 1, 1992

[30] Foreign Application Priority Data
Mar. 25, 1991 [FR] France .................. 91 03584

[51] Int. Cl.$^5$ ................................. B23K 7/06
[52] U.S. Cl. ........................... 266/51; 266/48
[58] Field of Search ....................... 266/48, 51

[56] References Cited
FOREIGN PATENT DOCUMENTS
3545729  6/1987  Fed. Rep. of Germany.

OTHER PUBLICATIONS
World Patents Index, Section Ch, Week 7722, Derwent Publications, Ltd., London, GB; Class M, AN 77-38716Y & JP,A,5 248 544 (Nippon Oxygen KK) Apr. 18, 1977.

Primary Examiner—Scott Kastler
Attorney, Agent, or Firm—Oblon, Spivak, McClelland, Maier & Neustadt

[57] ABSTRACT

A method for deburring especially a steel strip (1) cut into slabs (1a) with the aid of an oxygen cutting torch (18) whose blast is perpendicular to one (2) of the principal faces of the strip (1). The method consists in directing, onto the principal face (3) of the strip (1) opposite the principal face (2) receiving the blast from the oxygen cutting torch (18) and in the zone for cutting up the strip (1), a blast of fluid which is inert with respect to the blast from the torch (18).

16 Claims, 6 Drawing Sheets

METHOD AND DEVICE FOR DEBURRING ESPECIALLY A STEEL STRIP CUT INTO SLABS

BACKGROUND OF THE INVENTION

1. Field of the Invention

The present invention relates to a method and a device for deburring especially a continuously cast steel strip cut into slabs.

2. Description of the Related Art

In continuous casting of steel, a product is obtained which has the shape of a thick steel strip which has to be cut into specified lengths so as to obtain slabs which are then processed in rolling operations.

The steel strip coming from the continuous casting is cut into slabs by oxygen cutting with the aid of a torch which projects its blast perpendicularly to one of the principal faces of the strip.

The action of the cutting blast of the torch leads to a kerf in the metal, a kerf which forms a cut when the torch is moved over the strip.

The drawback of oxygen cutting resides in the fact that it causes burrs from molten steel on the principal face opposite that receiving the cutting blast from the torch.

These burrs constituted by oxygen cutting residues are formed on either side of the cut because of the disturbance from the removal of the cutting residues generated by the expansion of the residual gases at the exit of the said cut.

This phenomenon causes a bonding of the non-removed residues on each edge of the cut on the lower face of the slab.

In order to get rid of these burrs, up until now several solutions have been used.

One solution consists in manually grinding away the burrs.

Another known solution consists in using a machine comprising a set of cutting blades.

These blades are carried by a carriage which moves along the longitudinal axis of the slab below the lower face of the latter. These blades come into contact with the said lower face and cut off the oxygen cutting residues.

These solutions have drawbacks.

The reason for this is that they require an additional operation on the slab, distinct from the oxygen cutting operation, involving thereby the installation of a deburring unit with the extra cost and maintenance which stem therefrom.

SUMMARY OF THE INVENTION

The object of the present invention is to propose a deburring method and a device for implementing this method, enabling the formation of burrs to be avoided during the oxygen cutting operation and thereby the additional unit for deburring the slabs to be eliminated.

The subject of the present invention therefore is a method for deburring especially a steel strip cut up into slabs, with the aid of an oxygen cutting torch whose blast is perpendicular to one of the principal faces of the strip, characterised in that a blast of fluid which is inert with respect to the blast from the torch is directed onto the principal face of the strip opposite the said principal face receiving the blast from the oxygen cutting torch and in the cutting zone of the strip.

According to other characteristics of the invention:

the blast of fluid possesses a horizontal opening angle and a vertical opening angle lying between 10° and 40°, the blast of fluid is formed from two blasts directed one towards the other and intersecting in a zone comprising the axis of the oxygen cutting torch, the blast of fluid is formed from three blasts directed one towards another and intersecting in a zone comprising the axis of the oxygen cutting torch, the blast or blasts of fluid are formed by a flat blast whose horizontal opening angle lies between 10° and 40°, the inert fluid is air or nitrogen, oxygen is added to the inert fluid in a proportion of from 10° to 40°.

The subject of the present invention is also a deburring device for the implementation of this method, comprising an oxygen cutting torch perpendicular to one of the principal faces of the strip, the said torch being moveable, on the one hand in a direction transverse to the direction of advance of the strip, and on the other hand in a direction parallel to the said direction of advance and at an identical speed to the strip, characterised in that it comprises means for blowing a pressurised fluid into the cutting zone on the other principal face of the said strip.

According to other characteristics of the invention:

the blowing means are moveable in synchronism with the oxygen cutting torch, on the one hand in a direction transverse to the direction of advance of the strip, and on the other hand in a direction parallel to the said direction of advance and at an identical speed to the strip, the blowing means comprise a fluid projection nozzle disposed in the plane of the cut, the blowing means comprise two fluid projection nozzles angled one towards the other and disposed on either side of the plane of the cut, the axes of the said nozzles intersecting substantially on the axis of the oxygen cutting torch, the blowing means comprise three fluid projection nozzles angled one towards another and whose axes intersect substantially on the axis of the oxygen cutting torch, one of the said nozzles being disposed in the plane of the said cut and the other two being disposed on either side of the plane of the said cut, each nozzle can be angled in a horizontal plane and in a vertical plane, the axis of each nozzle, together with the axis of the oxygen cutting torch, determines an angle of incidence lying between 70° and 110°, each nozzle is formed by a nozzle giving a flat blast each nozzle is formed by a nozzle giving a conical blast.

BRIEF DESCRIPTION OF THE DRAWINGS

Other characteristics and advantages of the invention will emerge during the description which follows, with reference to the attached drawings, given solely by way of example, in which.

DETAILED DESCRIPTION OF THE PREFERRED EMBODIMENTS

Figure 1:
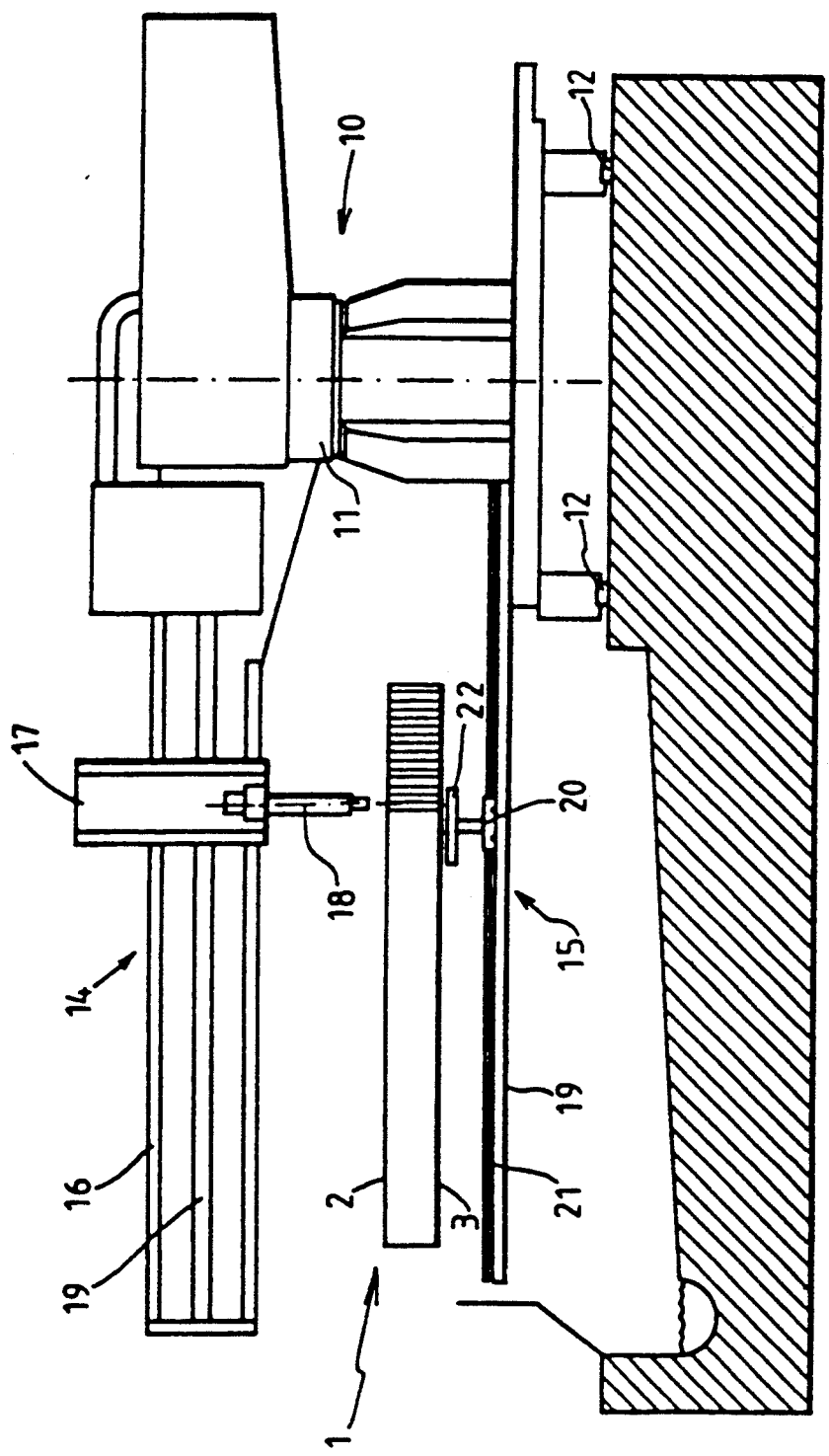
FIG. 1 is a diagrammatic overall view of an installation for oxygen cutting a steel strip, comprising a deburring device according to the invention.
Figure 2:
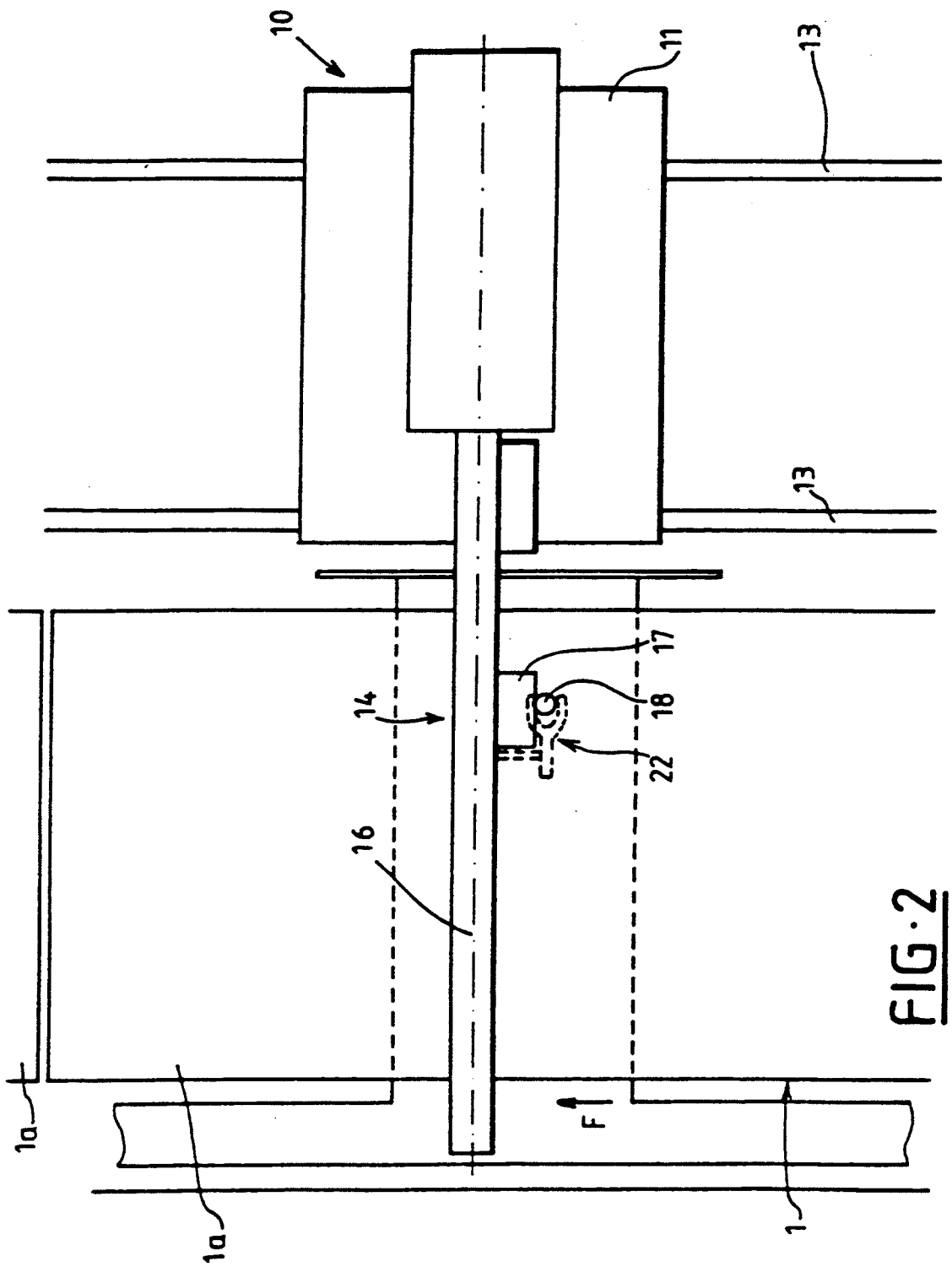
FIG. 2 is a view from above of FIG. 1.

In FIGS. 1 and 2 a steel strip 1 is shown leaving a continuous casting unit and travelling over rollers, which are not shown.

The direction of advance of the strip 1 is shown by the arrow F in FIG. 2.

This strip 1 has a substantially rectangular cross-section.

The strip 1 is cut up into specified lengths by an oxygen cutting installation 10 so as to obtain slabs 1a (FIG. 2) which are then processed in rolling operations.

The installation 10 shown in FIGS. 1 and 2 comprises a support frame 11 mounted so as to move, in a direction parallel to the direction of advance of the strip 1, on wheels 12 which move on rails 13.

The installation 10 also comprises a cutting device 14 extending above the upper principal face 2 of the strip 1 and a deburring device 15 extending below the lower principal face 3 of the said strip.

The cutting device 14 is formed by a horizontal arm 16 perpendicular to the direction of advance of the strip 1 and extending over the entire width of this strip.

The arm 16 is connected to the support frame 11. This arm 16 supports a moveable carriage 17 which carries an oxygen cutting torch 18 having a vertical axis and whose blast is perpendicular to the upper principal face 2 of the strip 1.

The carriage 17 and, consequently, the torch 18 move on the arm 16 perpendicularly to the direction of advance of the strip 1 by virtue of a drive mechanism 19.

This drive mechanism 19 is constituted, for example, by an endless screw rotationally driven by a constant-speed motor or by a rack.

The deburring device 15 is formed by a horizontal arm 19 perpendicular to the direction of advance of the strip 1 and extending over the entire width of the said strip.

The arm 19 is connected to the support frame 11. This arm 19 supports a carriage 20 which moves on rails 21 provided on the said arm.

The carriage 20 supports means 22 for blowing a pressurized gas and moves perpendicularly to the direction of advance of the strip 1 by virtue of a drive mechanism of known type, not shown.

The carriages 17 and 20, respectively cutting 11 and deburring 15 devices, move, on the one hand in synchronism with each other in a direction transverse to the direction of advance of the strip 1, and on the other hand in a direction parallel to the said direction of advance and at an identical speed to that of the said strip by the agency of the support frame 11 in such a way as to cut up the strip 1 into slabs 1a and at the same time to get rid of the burrs which form on the lower principal face 3, as will be seen subsequently.

Figure 3:
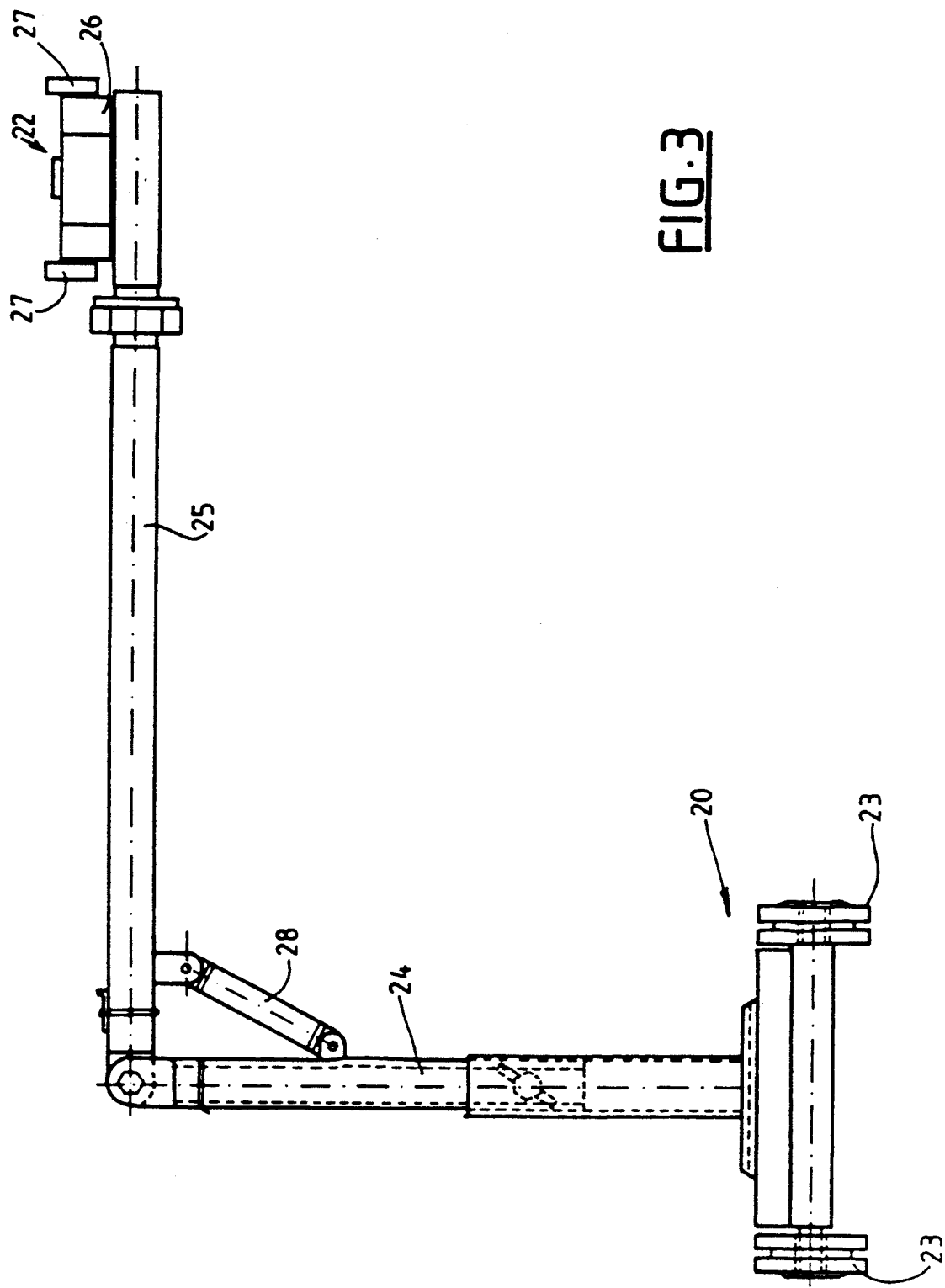
FIG. 3 is a view, in lateral elevation, of the member supporting the blowing means of hte deburring device according to the invention.

Referring now to FIG. 3, the carriage 20 of the deburring device 15 will now be described in more detail.

The carriage 20 comprises wheels 23 which carry a height-adjustable vertical rod 24 and on the upper portion of which a horizontal rod 25 is mounted in an articulated manner.

The blowing means 22 are mounted on the free end of the horizontal rod 25.

These blowing means 22 are especially constituted by a blowing head 26 fitted with rollers 27 extending beyond the upper portion of the said head and which are intended to bear on the lower principal face 3 of the slab 1.

For this purpose a thrust device 28 is mounted between the two rods 24 and 25 in order to keep the rollers 27 against the lower face 3.

In general, the blowing head 26 is located below the portion of the slab 1 which has not yet been cut up by the oxygen cutting torch 18.

Referring now to FIGS. 4 to 9, several embodiments of the blowing head 26 will be described.

Figure 4:
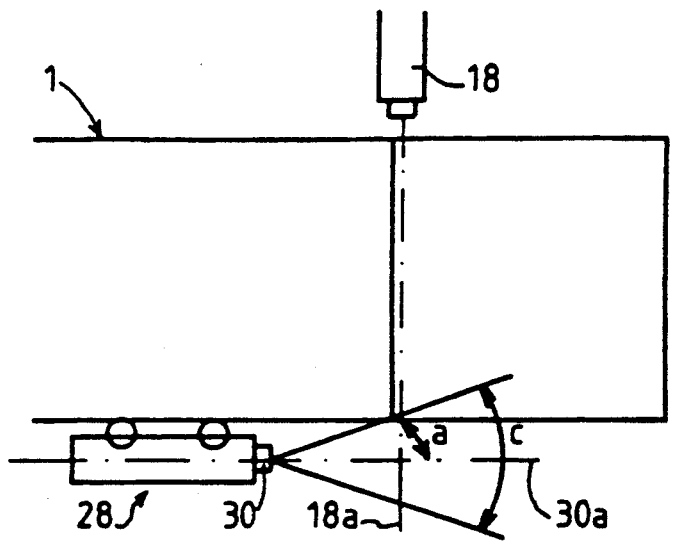
FIG. 4 is a diagrammatic view, in lateral elevation, of the blowing means according to a first embodiment.
Figure 5:
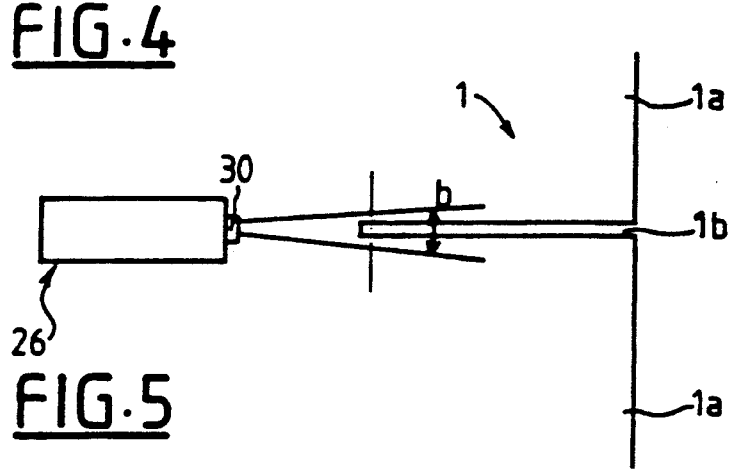
FIG. 5 is a view from above of FIG. 4.

According to a first embodiment shown in FIGS. 4 and 5, the blowing head 26 comprises a nozzle for projecting a pressurised fluid, the nozzle being disposed in the plane of the said cut 1b produced by the oxygen cutting torch 18 on the strip 1.

The axis 30a of the nozzle 30 determines, together with the axis 18a of the torch 18, an angle of incidence "a" lying between 70° and 110°.

The nozzle 30 can be a nozzle giving a conical blast or a nozzle giving a flat blast.

In the case of a nozzle giving a conical blast, the blast of fluid possesses a horizontal opening angle "b" lying between 10° and 40°, preferably equal to 15°, and a vertical opening angle "c" lying between 10° and 40°, preferably equal to 30°.

In the case of a nozzle giving a flat blast, the blast of fluid possesses a horizontal opening angle "b" lying between 10° and 40° and preferably equal to 30°.

The nozzle 30 can be angled in a vertical plane and in a horizontal plane.

Figure 6:
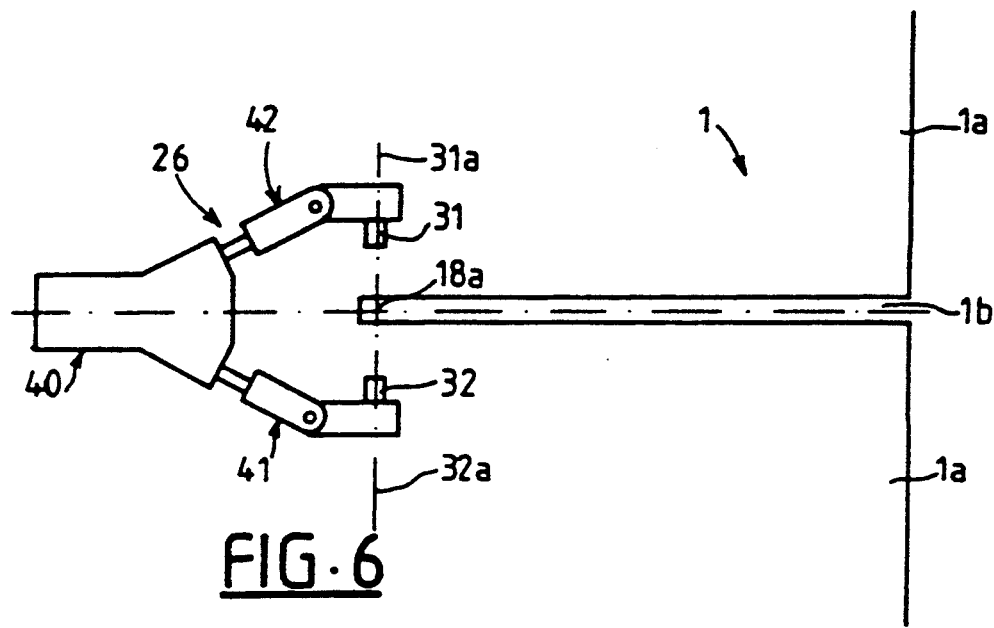
FIG. 6 is a diagrammatic view, in lateral elevation, of the blowing means according to a second embodiment.

According to a second embodiment shown in FIG. 6, the blowing head 26 comprises two fluid projection nozzles 31 and 32 angled one towards the other end disposed on either side of the plane of the cut 1b produced by the oxygen cutting torch 18 on the strip 1.

The axes 31a and 32a of the nozzles, respectively 31 and 32, intersect substantially on the axis 18a of the oxygen cutting torch 18.

These nozzles 31 and 32 are nozzles giving conical blasts or nozzles giving flat blasts, as before, and can be angled in a vertical plane and in a horizontal plane.

However, the axes 31a and 32a of the nozzles, respectively 31 and 32, also determine, together with the axis 18a of the torch 18, an angle of incidence lying between 70° and 110°.

Figure 7:
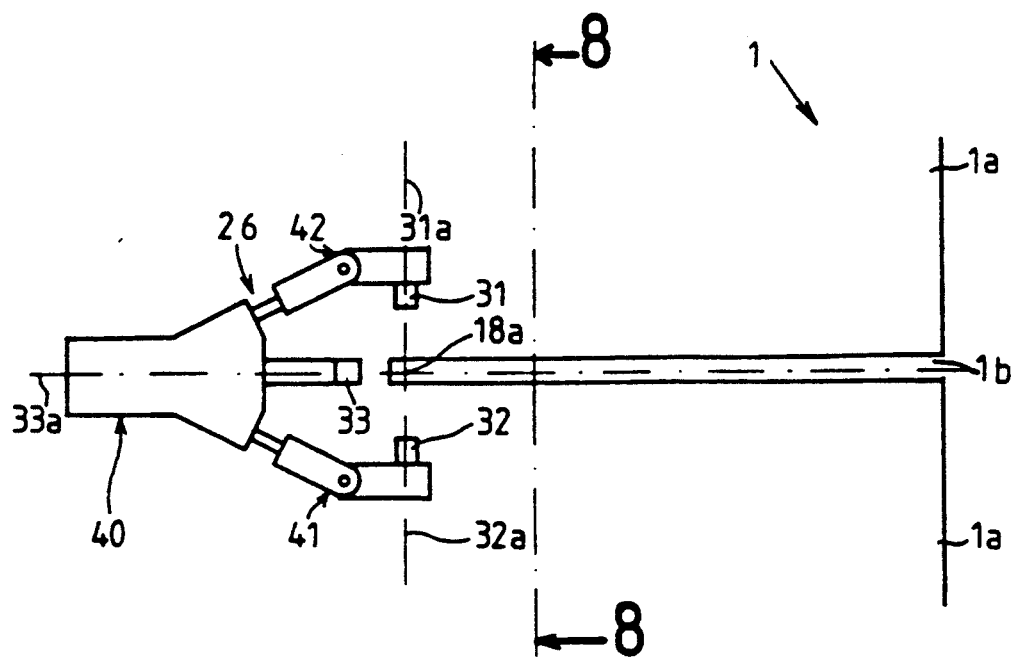
FIG. 7 is a diagrammatic view, in lateral elevation, of the blowing means according to a third embodiment.
Figure 8:
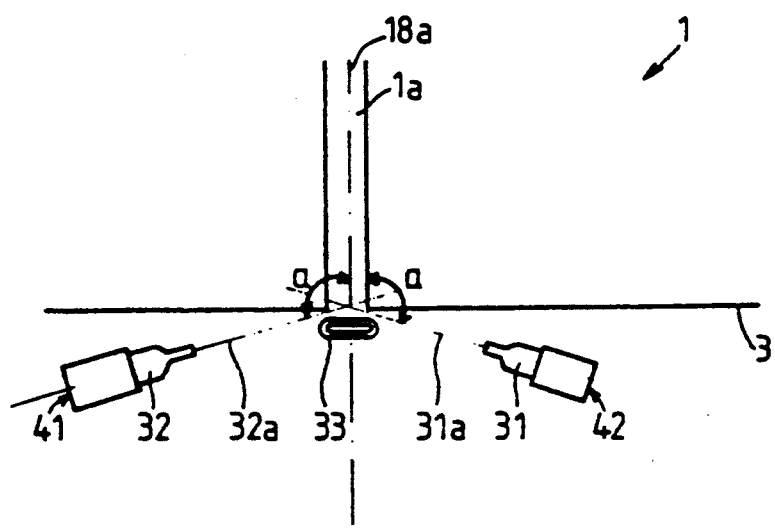
FIG. 8 is a view, in cross-section, along the line 8—8 of FIG. 7.

According to a third embodiment shown in FIGS. 7 and 8, the blowing head 26 comprises three fluid projection nozzles, two lateral nozzles 31 and 32 and a central nozzle 33, which are angled one towards another and whose axes, respectively 31a, 32a and 33a, intersect substantially on the axis 18a of the cutting torch 18.

The central nozzle 33 is disposed in the plane of the said cut 1b produced by the oxygen cutting torch 18 on the strip 1 and the lateral nozzles 31 and 32 are disposed on either side of the plane of the said cut 1b.

These nozzles 31, 32 and 33 are nozzles giving conical blasts or nozzles giving flat blasts, as before, and can be angled in a vertical plane and in a horizontal plane.

Moreover, the axes 31a and 32a of the nozzles 31 and 32, together with the axis 18a of the torch 18, determine an angle of incidence "a" lying between 70° and 110° (FIG. 8).

The axis 33a of the nozzle 33 is parallel to the lower principal face 3 of the strip 1 but can also form an angle of incidence lying between 70° and 110° with the axis 18a of the oxygen cutting torch 18.

Figure 9:
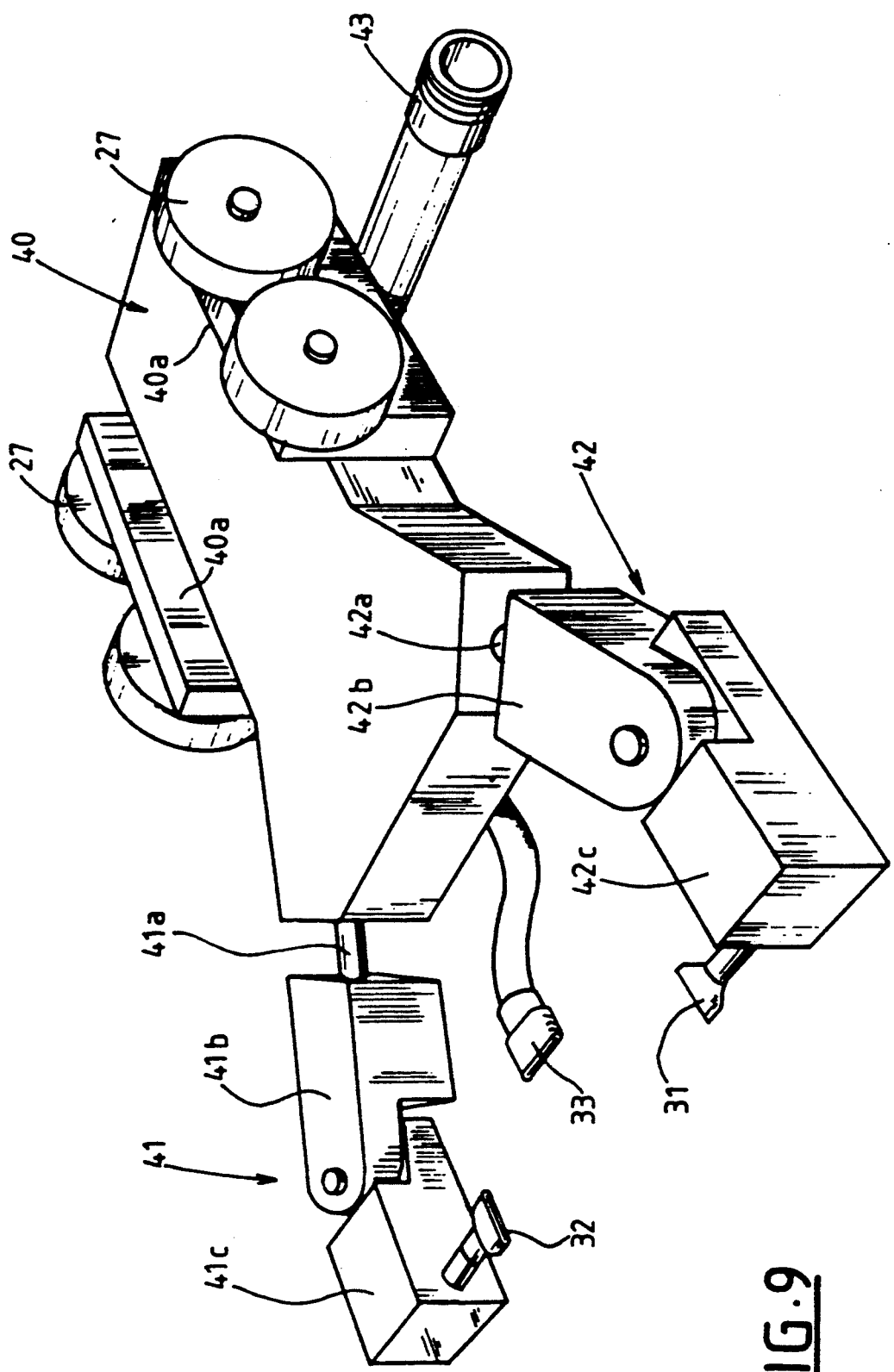
FIG. 9 is a view, in perspective, of the blowing means according to FIG. 7.

Referring to FIG. 9, a preferred embodiment of the blowing head 26 will be described.

The blowing head 26 supported by the carriage 20 by the agency of the rods 24 and 25 (FIG. 3) has the overall shape of a "Y".

This head 26 is constituted by a central branch 40 and two lateral branches 41 and 42.

The central branch 40 comprises, on each of its lateral walls, a small plate 40a supporting the rollers 27.

The lateral branch 41 is formed by a tube 41a constituting an articulation pin which is mounted on the central branch 40 and on the end of which a first support 41b is mounted.

A second support 41c supporting the nozzle 32 is mounted articulated on the end of this first support 41b.

The tube 41a makes it possible to angle the nozzle 32 in a vertical plane and the articulation between the supports 41b and 41c enables the nozzle 32 to be angled in a horizontal plane.

The same is the case for the lateral branch 42 which comprises a tube 41a, a first support 42b and a second support 42c carrying the nozzle 31.

The central branch 40a optionally carries the nozzle 33.

The head 26 also comprises a pipe 23 which simultaneously feeds the nozzles 31, 32 and 33 with pressurised fluid.

This pressurised fluid, which is inert with respect to the blast from the oxygen cutting torch 18, is, for example, air or nitrogen.

However, oxygen may be added to the inert fluid in a proportion of from 10 to 40%.

The entire installation can be controlled by an automaton managing the various functions, as, for example, the movements of the support frame 11, the oxygen cutting torch 18 and the blowing head 26.

While the strip 1 is being cut up into slabs 1a, the support frame 11 moves parallel to the direction of advance of the strip and the oxygen cutting torch 18 as well as the blowing head 26 move at the same time on either side of the said strip.

The action of the cutting blast from the torch 18 perpendicular to the upper principal face 2 of the nozzle 1 causes a kerf in the metal which forms the cut 1b when the torch moves.

Because of the disturbance from the removal of the cutting residues generated by the expansion of the residual gases at the exit of the cut 1b, burrs constituted by oxygen cutting residues form on either side of the said cut 1b on the lower principal face 3 of the strip 1.

The projection from the blast or blasts of fluid by the nozzle or nozzles 32 and 33 into the cutting zone, on the principal face 3 of the strip 1 opposite the principal face 2 receiving the blast from the torch, prevents these burrs being generated, by granulating the ejection of metal before it solidifies, when the metal is still in the liquid phase.

Thus, the method according to the present invention enables the formation of the burrs arising from the oxygen cutting residues during the cutting of the strip to be avoided and, consequently, the deburring unit in continuous casting installations to be eliminated.

Beyond the specific application mentioned hereinabove, the method and the device according to the invention may be implemented in other applications, for example for getting rid of any burrs generated in a cut by an oxygen cutter torch.

I claim:

1. Method for deburring a steel strip being cut into slabs by an oxygen cutting torch, comprising the steps of:
   applying a blast of an oxygen cutting torch perpendicular to one principal face of the strip to cut the strip at a cutting zone; and
   directing a blast of a fluid which is inert with respect to the blast from the torch onto an other principal face of the strip, which other principal face is opposite to said one principal face, said blast of inert fluid being directed to intersect said cutting zone.

2. Method according to claim 1, wherein the blast of inert fluid possesses an opening angle in a horizontal plane and an opening angle in a vertical plane lying between 10° and 40°.

3. Method according to one of claims 1 and 2 wherein the blast of inert fluid is formed by two blasts directed one towards the other and intersecting in a zone comprising the axis of the blast from the oxygen cutting torch.

4. Method according to one of claims 1 and 2 wherein the blast of inert fluid is formed from three blasts directed one towards another and intersecting in a zone comprising the axis of the blast from the oxygen cutting torch.

5. Method according to one of claims 1 and 2 wherein the blast of inert fluid is formed by a flat blast whose opening angle in a horizontal plane lies between 10° and 40°.

6. Method according to one of claims 1 and 2 wherein the inert fluid is air or nitrogen.

7. Process according to one of claims 1 and 2 including the step of adding oxygen to the inert fluid in a proportion of from 10 to 40%.

8. Deburring device comprising:
   an oxygen cutting torch extending perpendicular to one principal face of a steel strip for applying a blast of cutting oxygen onto a cutting zone on the one principal face to form a cut in the strip, said torch being moveable both in a direction transverse to a direction of advance of the strip and in a direction parallel to the direction of advance, and at an identical speed to the strip, and
   means for blowing a pressurised fluid onto the cutting zone on an other principal face of the strip.

9. Device according to claim 8 wherein the blowing means are moveable in synchronism with the oxygen cutting torch both in a direction transverse to the direction of advance of the strip, and in a direction parallel to the direction of advance, and at an identical speed to the strip.

10. Device according to claim 8 wherein the blowing means comprise a nozzle for projecting the fluid and disposed in the plane of the cut in the strip.

11. Device according to claim 8 wherein the blowing means comprise two nozzles for projecting the fluid, which nozzles are angled one towards the other and disposed on either side of the plane of the cut in the strip, the axes of said nozzles intersecting substantially on the axis of the oxygen cutting torch.

12. Device according to claim 8 wherein the blowing means comprises three nozzles for projecting the fluid, which nozzles are angled one towards another and whose axes intersect substantially on the same axis of the oxygen cutting torch, one of said nozzles being disposed in the plane of the cut in the strip and the other two nozzles being disposed on either side of the plane of the said cut.

13. Device according to any one of claims 10 to 12 wherein each said nozzle can be angled in a horizontal plane and in a vertical plane.

14. Device according to any one of claims 10 to 12, wherein the axis of each said nozzle, together with the axis of the oxygen cutting torch, determines an angle of incidence lying between 70° and 110°.

15. Device according to any one of claims 10 to 12 wherein, each said nozzle is formed by a nozzle giving a flat blast.

16. Device according to any one of claims 10 to 12 wherein, each said nozzle is formed by a nozzle giving a conical blast.

* * * * *